Patented June 21, 1938

2,121,731

UNITED STATES PATENT OFFICE 2,121,731

CELLULOSE ETHER RECOVERY

William R. Collings, Midland, Mich., assignor to The Dow Chemical Company, Midland, Mich., a corporation of Michigan No Drawing. Application July 30, 1936, Serial No. 93,428

2 Claims. (Cl. 260—152)

This invention relates to a method for the treatment of the product obtained by the etherification of alkali cellulose with an alkyl halide.

The etherification of alkali cellulose with an alkyl halide such as methyl bromide, ethyl chloride, propyl chloride, etc., yields a reaction product containing cellulose ether, some unreacted etherifying agent, the alcohol and ether corresponding to the etherifying agent, and alkali halide. It is among the objects of the invention to provide a method for treating said reaction product whereby the alkyl ether of the cellulose is obtained directly therefrom in a solution wherein it can be purified or otherwise treated. Another object of the invention is to provide a method whereby the unreacted etherifying agent can be recovered substantially quantitatively from said reaction product. Still a further object of the invention is to provide a method of separating the alkali halide from the above-described reaction product.

I have now found that the cellulose ether can be recovered from said reaction product according to the hereinafter-described procedure without unfavorably changing the physical characteristics of the ether. The reaction product from the etherifying step is mixed with an organic solvent for the cellulose ether, having sufficient available heat content to vaporize the unreacted alkyl halide employed in the etherification reaction from said product. The alkali halide is precipitated from the reaction mixture and the other products of the reaction are dissolved in the solvent. The suspension of the alkali halide in such solution is then led into an expansion chamber where the pressure is reduced so that the unreacted etherifying agent flash-evaporates therefrom. Some water, alcohol and ether of the etherifying agent, which are present in the reaction mixture, and solvent, may also flash-evaporate, or may be carried out in the vapors leaving said expansion chamber. This leaves in the chamber a suspension of the alkali halide in a solution containing the cellulose ether, substantially free from the unreacted etherifying agent, which may then readily be filtered to separate the alkali halide.

According to my procedure the reaction product is preferably discharged from the alkylator into a quantity of the organic solvent which has been heated to such temperature as to put therein sufficient available heat content to vaporize the unreacted etherifying agent from the reaction mixture. The mixing of the alkyl cellulose reaction product with the hot solvent is preferably carried out in a relatively small chamber wherein the alkylator discharge and the solvent are violently agitated during the mixing process. The resultant hot mixture is then led into a second chamber, under a lower pressure than that in said first chamber, and the unreacted alkyl halide flash-evaporates therefrom, the vapor issuing from the chamber being collected in any convenient manner. This leaves behind a solution of the cellulose ether containing alkali halide suspended therein. However, the hot solvent may be supplied directly to the alkylator and the alkali halide suspension led therefrom to a flash chamber, if the alkylator is large enough to permit the introduction of sufficient solvent thereinto to accomplish the desired result.

Among the organic solvents which are suitable for use in my method of treating the above-described reaction product are the aliphatic alcohols, particularly the lower aliphatic alcohols such as methyl, ethyl, propyl, etc., or mixtures of the same; the aromatic hydrocarbons such as benzene, toluene, xylene, or the mono- and di-chloro-derivatives thereof; the chlorinated aliphatic hydrocarbons, such as chloroform, 1.1.2-trichloroethane, propylene chloride, and the like; ketones, such as acetone, methyl ethyl ketone, or commercial "methyl acetone", which is a mixture of methyl alcohol, acetone, and methyl acetate; the alkyl ethers, such as diethyl ether or isopropyl ether; and the esters, such as ethyl acetate, butyl acetate, and the like; or mixtures of any of the foregoing materials, particularly those comprising an aliphatic alcohol. I have determined that in employing any of the foregoing organic solvents with aliphatic alcohols it is preferable to use the azeotropic mixture of such materials. My process may be applied to the treatment of products of the aforesaid etherifying reaction which contain methyl, ethyl, propyl, butyl, ethyl propyl, or other lower alkyl ethers of cellulose.

I will now describe the application of my process to the treatment of the product obtained by the reaction of alkali cellulose with ethyl chloride, to provide a detailed illustration of how the method hereinbefore given is to be carried out:

A reactor was charged with 356 pounds of alkali cellulose containing 26.8 per cent of cellulose, 55.3 per cent of sodium hydroxide, 16.9 per cent of water, and 1.0 per cent of sodium chloride, and thoroughly mixed with 1250 pounds of ethyl chloride. The ethylation of the cellulose was accomplished by heating the mixture at a temperature of 115° C. under a pressure of 225 pounds gauge for about 7 hours. At the end of this time the reactor contents, cooled to a temperature of about 90° C., were fed at a uniform rate over a period of 30 minutes into a stream of 95 per cent ethyl alcohol supplied at its boiling temperature under 30 pounds gauge pressure. The hot mixture was immediately introduced into an expansion chamber to reduce the pressure thereon, so that ethyl chloride and ethyl ether were flashed off, the vapor leaving the expansion chamber under a pressure of 20 pounds gauge. The quantity of ethyl alcohol used was approximately 1790 pounds. The vapors from the expansion chamber were run through a condenser to recover the ethyl chloride and ethyl ether. The alcoholic ethyl cellulose solution contained: alcohol 82 per cent, ethyl cellulose 5.0 per cent, suspended salt 7.5 per cent, dissolved salt 0.5 per cent, and traces of water, etherifying agent, and ether of the etherifying agent. The cellulose ether was recovered from this mixture by precipitation in water after the suspended salt had been filtered out.

In a modification of the above-described procedure the hot organic solvent solution comprising the reaction product can first be filtered to remove the alkali halide suspended therein and thereafter manipulated to flash off the unreacted etherifying agent. Also, the hot organic solvent may be mixed with the product of the alkylation reaction at atmospheric or super-atmospheric pressure and the mixture introduced into an evacuated expansion chamber, thereby to flash-evaporate the more volatile constituents. If desired, various purification and/or bleaching steps, etc., may be carried out on the suspension of alkali halide and cellulose ether solution prior to the removal of the salt therefrom, and any solid material insoluble in the solvent added for such purpose removed along with the salt upon filtration.

My method of separating cellulose ethers from the crude etherification product possesses, among others, the following advantages: (1) the cellulose ether is recovered directly from the crude reaction product in solution and may be purified therein, thereby eliminating the steps of separating, washing, drying, and subsequently dissolving the ether in a solvent, which is ordinarily done before purification; (2) the unreacted etherifying agent can be quantitatively recovered in an efficient and economical manner; (3) the method lends itself readily to adaptation as a continuous process; (4) the suspended salt serves as a filter-aid in removing unreacted cellulose and undesirable gelatinous masses from the product during the filtration step; and, (5) under the mild conditions of treatment prevailing during the separation, the physical characteristics of the cellulose ether are not materially altered, e. g. degradation is minimized.

This application is related to co-pending application Serial No. 93,763, filed August 1, 1936, wherein the use of lower monohydric aliphatic alcohols as solvents for the cellulose ether is disclosed.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of treating the product obtained by reacting alkali cellulose with an excess of an alkyl halide at an elevated temperature and under super-atmospheric pressure, the steps which consist in mixing said reaction product with a sufficient quantity of an organic solvent for the cellulose ether to retain said ether in solution when the residual etherifying agent and volatile by-products are removed therefrom, said solvent being a liquid having a boiling point above that of said etherifying agent and being selected from the group consisting of the lower aromatic hydrocarbons, the mono- and di-chloro- lower aromatic hydrocarbons, chlorinated aliphatic hydrocarbons, lower aliphatic ketones, lower alkyl ethers, the aliphatic acid esters of lower aliphatic alcohols, and mixtures of the foregoing, the solvent being supplied at a temperature and pressure such that the mixture obtained has a heat content sufficient to vaporize said residual etherifying agent when the pressure on the mixture is reduced; reducing the pressure on the so-formed mixture to flash off unchanged etherifying agent and other constituents of the reaction mixture which are more volatile than the solvent employed, whereby the cellulose ether is subjected to a solvent exchange wherein the lower boiling solvent, comprising the residual etherifying agent, is removed and the cellulose ether remains in solution in the higher boiling solvent, while the alkali metal halide, formed in the reaction, is undissolved.

2. In a method of treating the product obtained by reacting alkali cellulose with an excess of ethyl chloride at an elevated temperature and under super-atmospheric pressure, the steps which consist in mixing said reaction product with a sufficient quantity of an organic solvent for the ethyl cellulose to retain said ethyl cellulose in solution when the residual ethyl chloride and volatile by-products are removed therefrom, said solvent being a liquid having a boiling point above that of ethyl chloride and being selected from the group consisting of the lower aromatic hydrocarbons, the mono- and di-chloro- lower aromatic hydrocarbons, chlorinated aliphatic hydrocarbons, lower aliphatic ketones, lower alkyl ethers, the aliphatic acid esters of lower aliphatic alcohols, and mixtures of the foregoing, the solvent being supplied at a temperature and pressure such that the mixture obtained has a heat content sufficient to vaporize said residual ethyl chloride when the pressure on the mixture is reduced; reducing the pressure on the so-formed mixture to flash off unchanged ethyl chloride and other constituents of the reaction mixture which are more volatile than the solvent employed, whereby the ethyl cellulose is subjected to a solvent exchange wherein the lower boiling solvent, comprising the residual ethyl chloride, is removed and the ethyl cellulose remains in solution in the higher boiling solvent, while the sodium chloride, formed in the reaction, is undissolved.

WILLIAM R. COLLINGS.